W. T. Kirkpatrick.

Bee Hive.

No. 97,933.  Patented Dec. 14, 1869.

Witnesses:
Chas. Nida
Jno. F. Brooks

Inventor:
W. T. Kirkpatrick
by Munn & Co.
Attorneys

United States Patent Office.

W. T. KIRKPATRICK, OF TAMAROA, ILLINOIS.

Letters Patent No. 97,933, dated December 14, 1869.

IMPROVEMENT IN BEE-HIVES.

The Schedule referred to in these Letters Patent and making part of the same.

*To all whom it may concern:*

Be it known that I, W. T. KIRKPATRICK, of Tamaroa, in the county of Perry, and State of Illinois, have invented a new and useful Improvement in Bee-Hives; and I do hereby declare that the following is a full, clear, and exact description thereof, which will enable others skilled in the art to make and use the same, reference being had to the accompanying drawings, forming part of this specification.

This invention relates to improvements in bee-hives, and consists in the combination with bee-hives, in a peculiar way, of a moth-box and moth-passage thereto, calculated to entice the moth away from the bee-passage, and prevent them from entering thereat, as hereinafter specified.

Similar letters of reference indicate corresponding parts.

Figure 1:
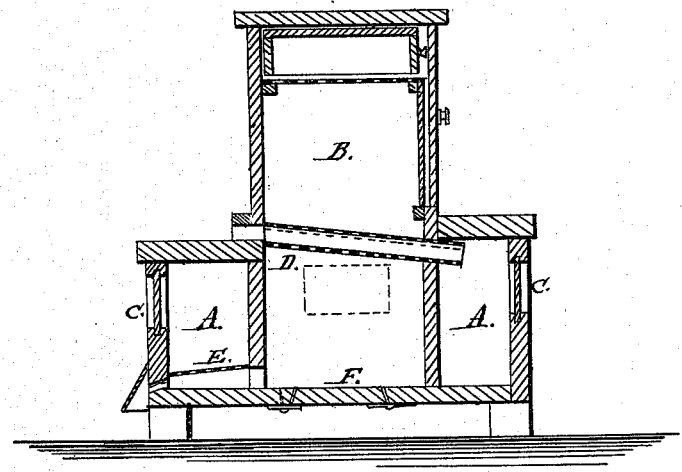
Figure 1 is a sectional elevation of my improved hive.
Figure 2:
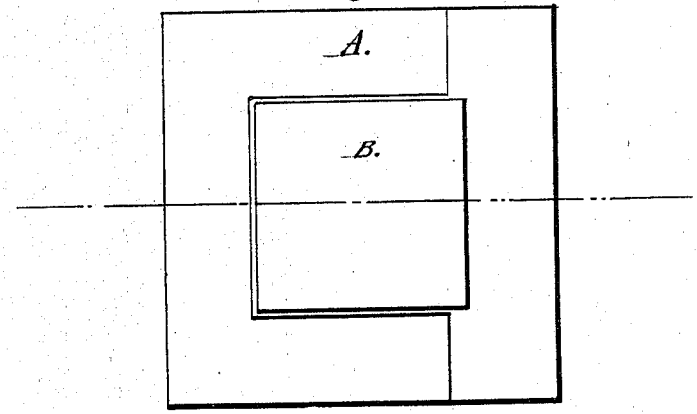
Figure 2 is a plan of the top of the same.

A is the miller-box, surrounding the lower part of the bee-hive B.

It has glass windows C at the sides, to admit the light.

D is a passage through the hive B, at the top of the miller-box into the same, at the opposite side. The exterior mouth of this passage is arranged in a conspicuous place, and the direction of it is toward the light coming in from one of the windows, whereby the moth will be attracted into it.

In the bottom of the moth-box I place quick-lime, to destroy them. This should be renewed about twice in a season.

The bee-passage E is arranged at the bottom through the moth-box, and, being dark, will not attract the moth, while the bees will enter there, but will not enter a passage where the moth go.

Other entrances may be made for the moth at the top of the moth-box, or elsewhere.

The bees may be introduced into the hive, in the first place, through the door F, at the bottom, and, finding their way out through the passage F, will afterward continue to pass out and in thereat.

The moth-box may have any suitable door for opening, to supply the quick-lime, and for cleaning it out.

Having thus described my invention,

I claim as new, and desire to secure by Letters Patent—

The combination of the bee-hive B, and the lighted moth-box A, when arranged as described, and provided with the moth and bee-passages, all substantially as specified.

The above specification of my invention signed by me, this     day of     , 1869.

W. T. KIRKPATRICK.

Witnesses:
E. H. PRICE,
ALVAH BLANCHARD.